Feb. 2, 1965 W. B. FAHRENBACH 3,168,230
STAMP DISPENSING MACHINE
Filed Aug. 20, 1962 4 Sheets-Sheet 1
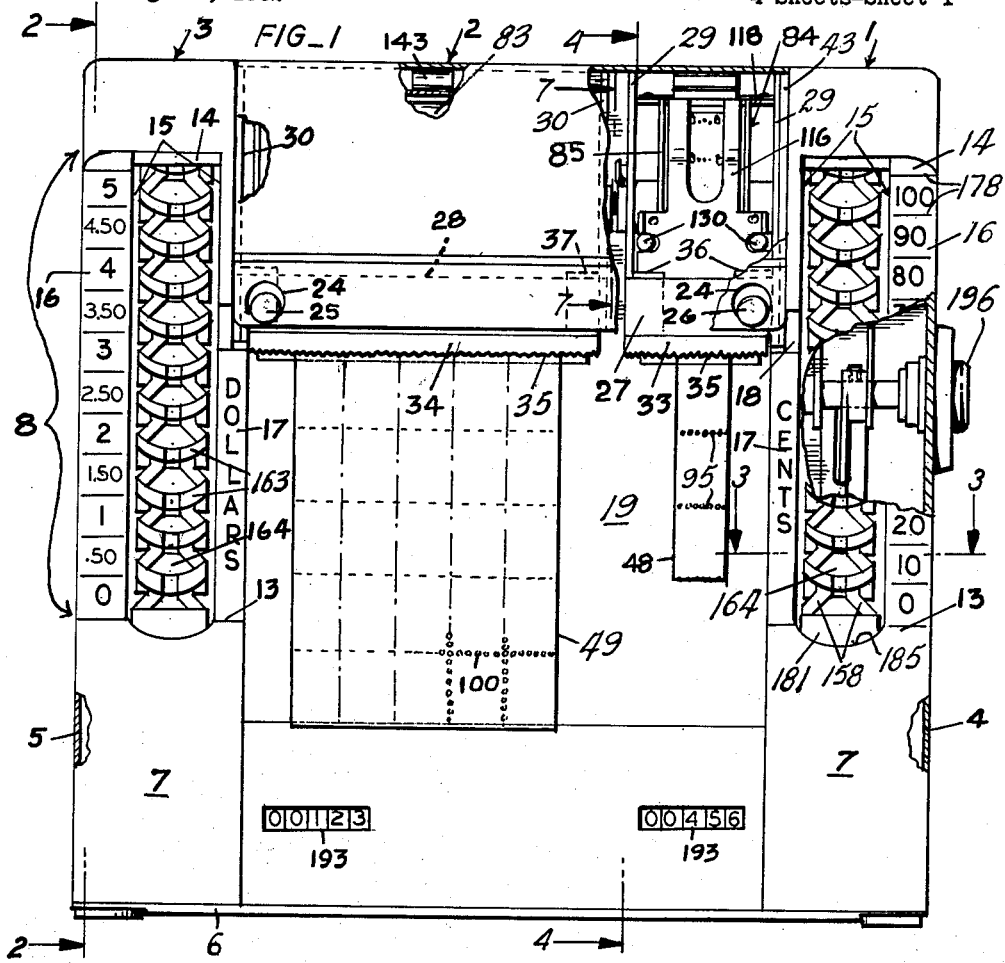
FIG_1
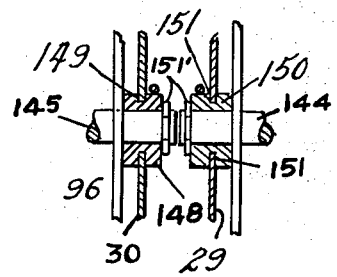
FIG_11
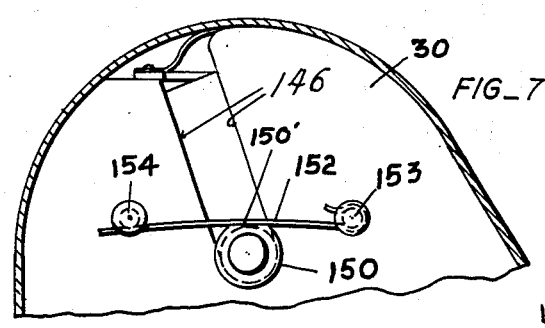
FIG_7
INVENTOR.
WOLFGANG B. FAHRENBACH
BY
Boykin, Mohler, Foster
ATTORNEYS

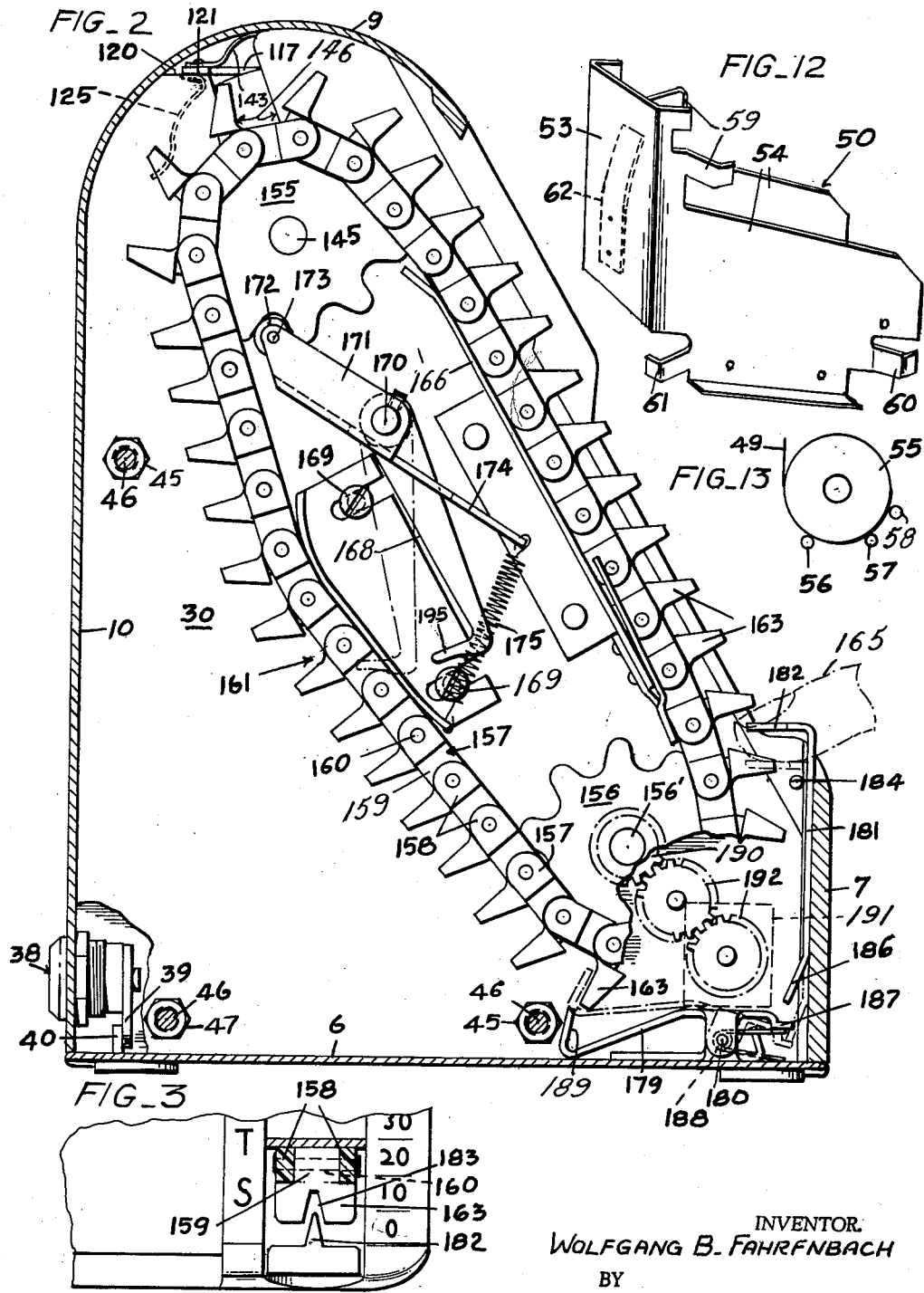

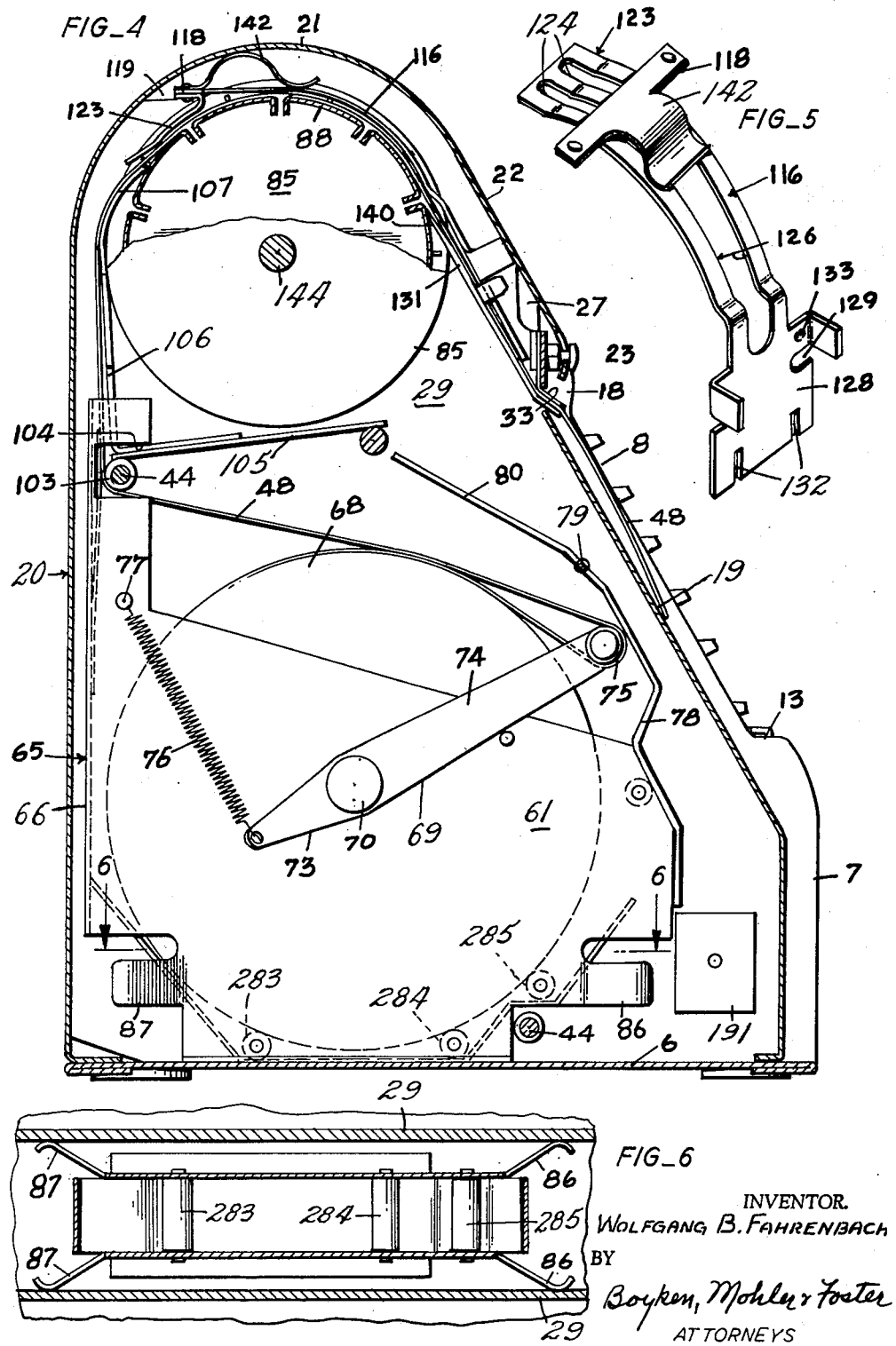

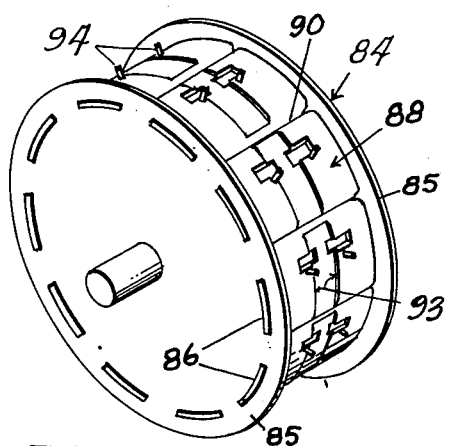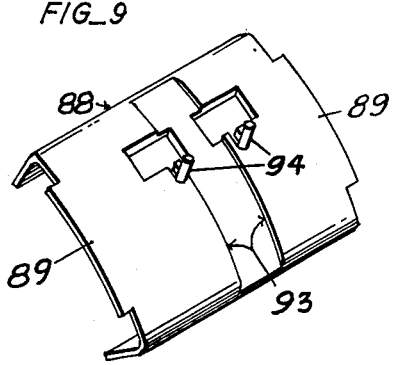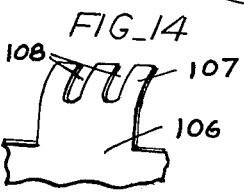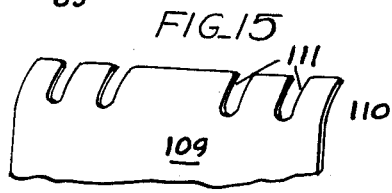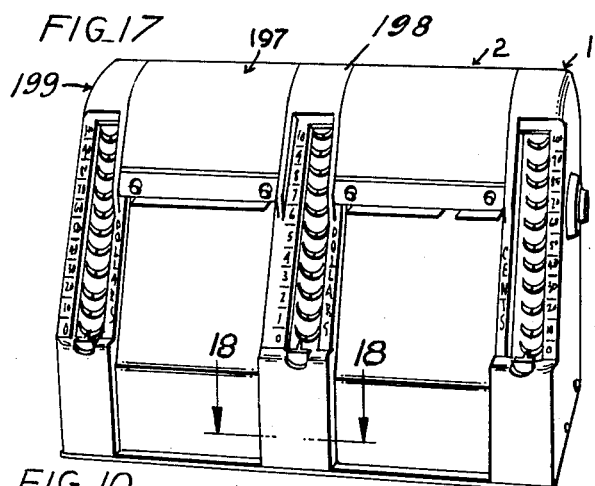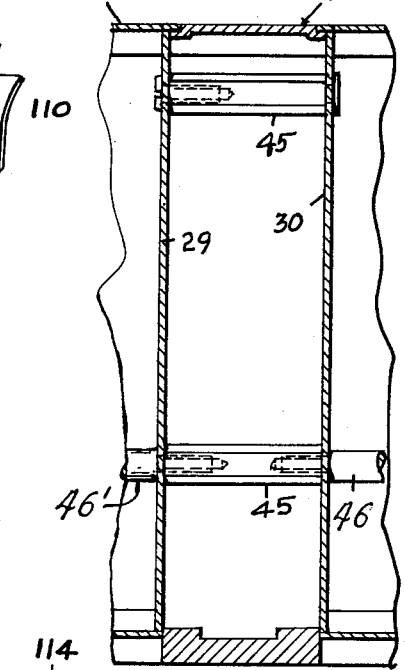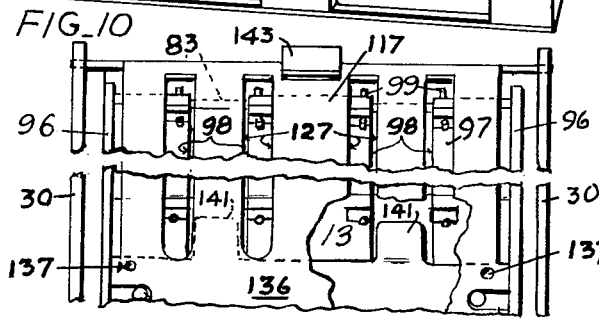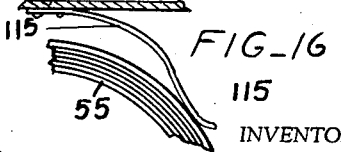

United States Patent Office 3,168,230
Patented Feb. 2, 1965

3,168,230
STAMP DISPENSING MACHINE
Wolfgang B. Fahrenbach, Oakland, Calif., assignor to Roto-Stamp Corporation, San Francisco, Calif., a corporation of California
Filed Aug. 20, 1962, Ser. No. 217,996
5 Claims. (Cl. 225—16)

This invention relates to a machine for dispensing stamps, such as trading stamps, from rolls thereon and is a continuation-in-part of my application Serial No. 136,231, filed September 6, 1961, now abandoned.

One of the objects of this invention is to provide a machine for dispensing trading stamps that is rugged, economical to make, small in size, easy to operate and that is substantially trouble free. The last feature, of course, is one of the factors of maintenance.

Most machines heretofore made for dispensing trading stamps, which is one of the main uses of the present invention, have failed to be adopted for many reasons, among which are (a) excessively high maintenance requirements, (b) failure to operate as intended due to dust and particles dropping from the stamps and becoming deposited on the working parts, (c) failure to operate consistently when actuated by different persons that have different ways of actuating the machines, (d) complexity of the mechanism, requiring a high degree of mechanical skill and excessive amount of time to refill machines after the stamps have been exhausted, (e) difficulty of efficiently actuating the machines, (f) failure of machines to consistently dispense the stamps with accuracy under all conditions of the stamps and under different operating conditions encountered in actual practice.

The importance of trading stamp dispensing machines overcoming all of the above difficulties can be appreciated when it is considered that in many stores that give trading stamps, with many customers in many lines waiting to make payment for goods purchased, a breakdown of a trading stamp dispensing machine at a cashier's station in any of the lines will cause an unexpected delay in all of the lines, which will result in dissatisfied customers.

One of the objects of the present invention is the provision of a stamp dispensing machine that overcomes all of the difficulties enumerated above.

An added object of the invention is the provision of a stamp dispensing machine in which an endless chain extending over a pair of sprocket wheels on a pair of shafts has the finger actuatable means for dispensing the stamps integral with the chain and one of the shafts supports a drum thereon that directly engages the stamps for dispensing the latter when the chain is moved by the finger, thereby providing a positive direct drive for the stamps free from gears, countershafts, pulleys, belts, chains, etc., between the finger actuated chain and the stamp moving drum.

A still further object of the invention is the provision of a small, compact, stamp dispensing machine constructed for straight line movement of a finger of the operator on a movably supported element for dispensing stamps and which movement is generally downward, but inclined toward the operator in a downward direction, hereby a rapid, easy and positive movement of the stamp dispensing element will be effected. In explanation of this, where the operator must rotate a dial, as in many stamp dispensing machines, the finger frequently slips out of the dial opening, with the result of imperfectly dispensed stamps. A horizontal movement of the finger to actuate the stamp dispensing mechanism is awkward and where the actuating finger must not only effect movement of the stamps, but must also actuate other mechanisms in the machine, the operator soon becomes tired and inefficient.

Another object of the invention is the provision of a stamp dispensing machine adapted to accurately dispense stamps of different denominations and different numbers thereof from rolls of stamps and which machine eliminates the need for a movable cutting knife, but provides means for quickly separating the dispensed stamps from the roll or rolls thereof.

Other objects and advantages will appear in the description and in the drawings.

In the drawings,

FIG. 1 is a front elevational view of a stamp dispensing machine, partially broken away to illustrate internal structure.

FIG. 2 is a cross sectional view taken along line 2—2 of FIG. 1 with certain portions within the machine broken away to disclose certain portions of the machine.

FIG. 3 is a fragmentary, enlarged view, partly in cross section, as seen from line 3—3 of FIG. 1.

FIG. 4 is a cross sectional view taken along line 4—4 of FIG. 1 with one end of a stamp moving drum broken away.

FIG. 5 is a view of one of the parts of the machine separate from the machine.

FIG. 6 is a cross sectional view of a portion of the machine as seen from line 6—6 of FIG. 4.

FIG. 7 is a fragmentary sectional view of part of the machine as seen from line 7—7 of FIG. 1.

FIG. 8 is an isometric view of one of the stamp moving drums.

FIG. 9 is an enlarged isometric view of one of the segments of the drum of FIG. 8.

FIG. 10 is a fragmentary elevational view of the upper portion of the wide stamp moving drum associated with other parts, partly broken away to show structure.

FIG. 11 is a fragmentary enlarged sectional view of the adjacent bearings for the two drums.

FIG. 12 is a perspective view of the magazine for the wider roll of stamps in the machine.

FIG. 13 is a semidiagrammatic, reduced size view showing the roller supports in the magazine of FIG. 12 for the wide roll of stamps.

FIGS. 14, 15 are fragmentary views showing the upper ends of guide plates for the stamps where they pass onto the stamp moving drums.

FIG. 16 is a fragmentary, reduced size view showing a leaf spring that is adapted to engage the forward side of the larger stamp roll of the pair illustrated.

FIG. 17 is an isometric view of a stamp dispensing machine of a larger capacity than the machine of FIG. 1.

FIG. 18 is an enlarged sectional view taken along line 18—18 of FIG. 17.

The machine illustrated in FIGS. 1–9 comprises a housing that is in three parts generally designated 1, 2 and 3 (FIG. 1), the parts 1 and 3 are the two opposite end sections, the end section 1 having one end wall 4 closing one end of the housing while the end section 3 has the opposite end wall 5 of the housing, and said end section 1 has a flange extending from the edges of wall 4 toward the opposite end of the machine, while wall 5 has a corresponding flange extending from its edges toward the end section 1.

A horizontal bottom wall 6 supports the frame members that, in turn, support the operating parts of the machine, which may also be the bottom of the housing, since it extends the full length of the machine below sections 1, 2 and 3.

The lower portions of each end section do not have flanges thereon, and referring to FIGS. 1 and 2, the numeral 7 designates the vertically disposed lower forward flanges on the end sections 1 and 3 which extend vertically and the flange continues upwardly and is inclined rearwardly from its lower to its upper end as generally designated at 8 (FIGS. 1, 2) to provide a forward inclined portion. The flange then continues in a curved upper portion 9 that continues vertically downwardly to provide a rear portion 10 (FIG. 2).

The forward inclined portion 8 is depressed from lower point 13 to an upper point 14 along one side 16 of an elongated slot 15 that is formed in the flange 8, while the side 17 of the flange 8 at the other side of the slot is correspondingly depressed from point 13 to an upper point 18.

The words "forward," "forwardly," "rear," "rearwardly" and words of similar import are used with reference to the sides of the machine that face toward and away from the operator. Thus the forward side of the machine is the side that faces the operator, while the rear side is the side that is opposite thereto.

The forwardly facing surface of the side 16 of flange 8 on section 1 may carry a row of equally spaced numerals extending longitudinally thereof. As seen in FIG. 1 the numerals on side 16 are from "0" to "100," starting at the lower end of the slot and terminating with the numeral "100" at the upper end.

The side 16 of section 3 may be a different series of numbers, starting for example with "0" at the bottom and terminating with "5" at the upper end of the slot, with successive numerals in the row progressively increasing by units of ".50," such as "0"—".50"—"1".

The inclined forwardly facing surface of side 17 of flange 8 on section 1 may bear the word Cents while the side 17 of flange 8 on section 3 may bear the word Dollars. These are purely by way of an example, since the figures and words may be varied to fit the circumstances.

The central housing section 2 is actually in two parts, one part 19 being the forward portion that is rigid with the bottom wall 6, and which portion extends vertically at its lower end and then slantingly rearwardly to correspond to the inclination of the flange portions 8, but the upper end of said forward portion or side 19 terminates at approximately the point 18 (FIG. 4). This forward portion of the housing does not extend as far forwardly as the forward surfaces of flange portions 7 and 8.

The other part of the central section 2 of the housing is generally designated 20, and extends vertically at the rear side of the machine (FIG. 4) and then curves forwardly as at 21 to close the top of the central part of the machine and then slantingly downwardly as at 22 to terminate at approximately the point where the upper end of the forward portion 19 terminates, but spaced forwardly of the upper edge of said portion 19, and the margnial part 23 (FIG. 4) of said portion 22 where it terminates is curved slightly rearwardly in a direction generally toward the terminating upper edge of the lower forward portion 19 of said central section 2. Said marginal part is formed with a pair of openings 24 (FIG.1) adjacent to the ends thereof that are adapted to pass the enlarged heads 25, 26 of a pair of pins rigidly secured to and projecting forwardly from a pair of flat horizontally extending, longitudinally aligned bars 27, 28 that are respectively secured at their ends to pairs 29, 30 of vertically disposed, horizontally spaced plate-like frame members (FIGS. 1, 2, 4). Said frame members are rigid relative to the bottom wall 6, and to each other.

Rigidly secured against the rear sides of the bars 27, 28 and coterminous with each of the latter are cutter blades 33, 34 (FIGS. 1, 4) the lower marginal portions of which project below the bars 27, 28 and terminate in downwardly directed teeth 35 (FIG. 1). The frame members 29 are formed along their forward edges with ears 36 that project toward each other, and the ends of the blade 33 are secured between said ears and the ends of bar 28, while similar ears 37 corresponding to ears 36 are on the pair of frame plates or members 30 and project toward each other. The ends of cutter blade 34 are secured between said ears 37 and the bar 28.

From the foregoing, it is seen that the cutter blades 33, 34 virtually are part of the central section of the housing, and the lower marginal portion of each blade is inclined forwardly in a downward direction so that the rows of teeth 35 along the lower edges of the blades are spaced over the upper marginal portion of the panel 19 of the central housing section 2.

Approximately centrally between the side edges of the rear panel of the central housing section 2 along the lower marginal portion thereof is a key actuatable lock 38 having a latch element 39 that is at the inner side of the panel, and which element is adapted to be rotated by rotation of a key in the lock, to be revolved to a position behind a rigid catch 40 secured to bottom wall 6 for locking the removable central housing part 20 in locked position, when the rear panel of part 20 is vertical and the heads 25, 26 of the rigid pins on bars 27, 28 extend through the openings 24 in the part 23 that is the forward marginal portion of part 20. The part 20 cannot be removed until the latch element is turned to be free from engagement with catch 40, but when the latch element is so turned the removable part 20 of the central housing section 2 readily swings upwardly about the pins that carry heads 25, 26 and the part 20 may easily and quickly be removed to expose all of the interior mechanism between the outermost of the frame plates 29, 30 that are respectively at and against the flanges of the end sections 1 and 2. The flanges of both end sections 1, 2 are rabbeted at 43 (FIG. 1) to receive the marginal portions along the side edges of the removable part 20 of the central section as well as the marginal portions of the front portion or panel 19 of the central housing section 2.

Bolts 44 (FIG. 4) having spacers thereon between the frame plates 29, 30 secure the frame plates rigid relative to each other, and said plates are rigidly secured along their lower edges to the bottom plate 6. Nuts 45 that are axially elongated are secured on the ends of the bolts 44 and extend to each of the vertical panels 4, 5 of the end sections 1, 2, and machine screws 46 (FIG. 2) extend through said end panels 4, 5 and into the outer ends of said nuts to secure the end sections 1, 3 at the ends of the central housing 2.

In FIG. 2 a nut 47 is shown at the lower left hand corner of the frame plate 30, and a similar nut, in alignment therewith, is secured to and projects outwardly from the frame plate 29 that is at the other end of the machine. These nuts are not secured on through bolts, but are for the machine screws that secure the end panels 4, 5 thereto.

The stamp dispensing machine illustrated in FIGS. 1 to 10 is adapted to dispense stamps from a roll in which there is a single file of stamps, and also to dispense stamps from a roll in which there are five connected files of stamps or a "five-wide" roll of stamps. In FIG. 1 in full line, three dispensed stamps from the "one-wide" roll at the right hand side of the machine are indicated at 48 while five rows from the "five-wide" stamp roll are indicated at 49 in dispensed position, but the dispensed stamps 48, 49 are merely depending or hanging over the rigid front housing panel 19 in which position the operator may quickly tear both of the sections of dispensed stamps 48, 49 from the roll by pulling them against the teeth 35 of the cutters.

The magazine shown in FIG. 12, and generally designated 50, is adapted to support the wide roll of stamps, and the magazine for the one-wide roll of stamps is substantially the same, except that it is narrower and includes a tensioning device, as will later be explained. Magazine 50 has a vertical rear wall 53 that is adjacent to the rear housing wall 20 when the magazine is in the housing, and it has a bottom wall and a pair of spaced opposed side walls 54 between which the five-wide roll of stamps 55 (FIG. 13) is adapted to be positioned. Rollers 56, 57 (FIG. 13) extending between the side walls 54 are adapted to support the roll of stamps, while a third roller 58 at the forward side of the roll 55 is in a position to engage the roll 55 in the event the latter is pulled against it, since the stamps 49 are drawn upwardly from the rear side of the roll in a dispensing operation.

A pair of divergent, outwardly extending, relatively stiff, but resilient spring arms 59 project forwardly from the upper portion of the magazine 50 adjacent to the rear wall, and a similar pair 60 project forwardly from the forward lower portion of side walls 54. A similar pair of rearwardly projecting divergently extending arms 61 project from the lower portion of the side walls 54 adjacent to rear wall 53.

These arms 59, 60, 61 slidably engage the adjacent sides of the frame plates 30 upon sliding the magazine into the machine from the rear side when the central housing portion 20 is removed.

Also a relatively light leaf spring 62 is secured at its lower end to the rear wall 53 within the magazine, which spring extends divergently forward from its lower end to engage the rear side of the web of stamps that are drawn upwardly from the roll 55 in a stamp dispensing operation.

The arms 59, 60 and 61 function to yieldably hold the magazine in position between plates 30 and on bottom wall 6, and to properly position the magazine in between the plates as well as to guide the magazine in inserting it between the plates 30.

As already mentioned, the magazine for the narrower roll of one-wide stamps is substantially the same as magazine 50, and is generally designated 65 (FIG. 4). This magazine has a rear wall 66 and opposed, parallel, forwardly extending side walls 67 between which the roll of stamps 68 is adapted to be positioned.

The main difference between this magazine 65 and the magazine 50, apart from the fact that the magazine 65 is quite narrow, is the provision of a stamp tensioning arm generally designated 69 pivotally connected at 70 (FIG. 4) to one of the side walls 67 at a point near one end of the arm, so that a short end portion 73 of the arm will be at one side of the pivot and a long arm portion 74 at the opposite side. A roller 75 is rotatably supported at the outer end of the portion 74 and projects at right angles to the arm so as to extend across the roll of stamps 68 at the upper forward side of the roll. A relatively light helical spring 76 connects the short portion 73 with a pin 77 secured to side wall 67 at a level above the pivot 70. The stamps 48 withdrawn from the roll 68 will extend below the roller 75.

A plate 78, pivotally supported at 79 to side walls 67 so as to swingably depend from its pivots closes the forward open side of the magazine, and an upper extension 80 on plate 78 extending above pivots 79 and in a rearward direction extends over the roller 75.

Rollers 283, 284, 285 correspond in positions to rollers 56, 57, 58 for supporting the roll 68, and pairs of spring arms 86, 87 correspond to spring arms 60, 61, but there are no spring arms on the magazine 65 corresponding to spring arms 59 of the magazine 50. The magazine 65 is between the pair of plates 29 and the spring arms 86, 87 function to guide the magazine to its proper position between said plates and to yieldably hold it in the desired position (FIG. 6).

Spaced above the magazines 50, 65, respectively, are stamp moving drums 83, 84 (FIGS. 4, 8, 10) which drums are of the same general structure, except that the drum 83 is for the stamps from the wide roll 55 while the drum 84 is for stamps from the narrow roll 68.

Referring to FIG. 8 which shows the drum 84 in detail, said drum comprises a pair of circular, opposed, coaxial end discs 85, each formed with an annular row of arcuately extending elongated slots 86 of equal length that are concentric with the axis of the discs. Said slots are in the marginal portions of the discs and the slots in one disc are in alignment, axially of the discs, with the slots in the other disc.

A plurality of corresponding segments 88 forming an annular row thereof concentric with the axis of the discs extend between and connect the discs.

Each segment 88 (FIG. 9) is curved transversely thereof and is formed with projections 89 at its ends that extend into slots 86 and that are rigidly secured in said slots. When the segments are all secured between discs 85 their arcaute convex outer surfaces coact to form the cylindrical surface of the drum, broken circumferentially of the drum by transverse outwardly opening grooves 90 (FIG. 8) at the junctures between the segments.

Each segment 88 is formed centrally between its ends with a corresponding shallow, relatively wide groove 93 extending transversely thereacross. These segments, as well as disc 85, are preferably of metal, and at the junctures between the sides of each groove 93 and the end portions outwardly thereof, each segment is stamped out to provide a radially outwardly projecting cylindrical pin 94 that has a rounded outer end. This structure provides spaced pairs of pins around the drum, and the spacing of each pair from the adjacent pairs is equal to the spacing between the transverse rows of perforatons 95 between stamps (FIG. 1).

This stamping of the pins from the metal of the segments not only insures accuracy of the positioning of the pins, but it assures against loosening of the pins, as would be likely to occur were the pins separately formed and then secured in segments or in a drum, and the pins are wear resistant. It should be noted that in many instances the stamps may have inaccuracies that place unusual wear on the pins, since the stamps 48 extend from the roll 68 over the rear and top sides of the drum 84 and then downwardly below the cutter and out the forward side of the housing at the upper end of the front panel 19 when the stamps are dispensed. By this structure the pins 94 function similar to the teeth of a sprocket wheel in which the openings 95 in the stamps correspond to the openings in a sprocket chain. The width of the stamps is such that they span the circumferentially extending shallow grooves 93 and are in lapping relation to the marginal portions of the segments along opposite sides of said grooves.

The wide drum 83 that is over the magazine 50 has opposed end discs 96 (FIG. 10) that correspond to discs 85, and the segments 97 that extend between the discs are similar to segments 88 except that they are sufficiently long to support the five-wide strip of stamps 49 from the roll 55 thereof.

There are only a pair of shallow grooves 98 formed in the segments 88 and these are spaced apart so as to underlie the portions of the wide strip of stamps 49 spaced at opposite sides of the center of the drum. Pairs of pins 99 corresponding to pins 94 are along opposite sides of each of the grooves 98, and which pins and grooves are formed in the same manner as pins 94 and groove 93 of FIG. 9. The five-wide strip 49 of stamps extends upwardly, past and in engagement with spring 62 when the roll is new, and over the rear and top sides of drum 83 and partially down the forward side the same as described for the strip 48. The pins 99 extend through the horizontal rows of perforations 100 (FIG. 1) where the stamps pass over the drum.

Referring back to FIG. 4, the stamps 48 from roll 68 extend forwardly from the upper side of roll 68 and under and around the roller 75 on arm 73 and then back to below a roller 103 on rod 44, the latter being adjacent to rear wall 66 of the magazine 65. Relatively narrow upward extensions on side walls 67 are formed with forwardly opening slots 104 to freely receive the roller upon inserting the magazine into the housing, and the upper edge of the slot also passes over a generally horizontally extending partition wall 105 that includes an upward extension of a plate 106 over which the stamps slidably extend until the pins 94 enter the perforations 95 between the adjacent stamps. The upper end portion 107 of this guide plate 106 is curved forwardly (FIGS. 4, 14) and is formed with a pair of upwardly opening slots 108 to pass the pins 94 on drum 84. The stamps slidably pass over the rear side of this guide plate 106 and are led forwardly onto the drum (FIGS. 4, 14).

The roller 75 becomes a yieldable take-up and relief means to prevent undue strain on the strip of stamps extending between the drum 84 and the roll of stamps 68 upon a sudden actuation of the drum 84 that would otherwise break the strip if there was no relief on the strain imposed thereon before the roll 68 could rotate.

No corresponding arm 69 and roller 75 is required for the wider roll 55 since the greater width of the strip has been found to be adequate to take any strain imposed thereon upon sudden activation of the wide drum 83.

However, a guide plate 109 (FIG. 15) having a forwardly curved upper portion 110 with upwardly opening pairs of slots 111 formed therein for passing pins 99 guide the wide strip of stamps onto the wide drum in the same manner as the stamps 48 are guided onto drum, and this guide plate extends upwardly from a partition plate 114 (FIG. 16) that is below the wide drum, and that corresponds to plate 105 (FIG. 4) that is below drum 84. A leaf spring 115 is secured at one end to the partition 114 and curves downwardly to yieldably and slidably engage the forward upper side of the roll 55 of wide stamps.

Referring to FIGS. 1, 4, an arcuately curved hold-down plate 117 (FIG. 10) extends over the drum 83. Plate 116 is disposed between the upper ends of discs 85 of drum 84 and plate 117 is disposed between discs 96 of drum 83. Oppositely outwardly extending ears 118 intermediate the ends of plate 116 and integral therewith are adapted to be removably supported on horizontal seats 119 (FIG. 4) formed on the upper edges of the frame plates 29 while similar horizontal seats 120 (FIG. 2) formed at the upper ends of the frame plates 30 removably support similar ears 121 formed on the plate 117. A rearward downwardly curved extension 123 is secured to plate 116 and this extension is adapted to slidably engage the single strip of stamps 48 just above the point where the upper end 107 of guide strip 106 guides the stamps into engagement with the pins 94 on the drum, said extension being slotted at 124 in a direction circumferentially of the drum to pass said pins. A corresponding pair of extensions 125 (FIG. 2) secured to plate 117 extend downwardly and rearwardly from the rear end of plate 117, each being slotted the same as extension 123 to pass one of the pairs of rows of pins 99 on wide drum 83. The lower marginal portions of both extensions 123 and 125 are curved slightly rearwardly away from the drums 84, 83.

Plate 116 is slotted at 126 longitudinally thereof to pass the pairs of pins 94 so that the arcuate portions of the plate along opposite sides of the slot will be adapted to lightly and slidably engage the stamps, and the plate 117 (FIG. 10) is formed with similar but narrower slots 127, each adapted to pass one of the circumferentially extending rows of pins 99 on drum 83.

The lower end portion 128 of strip 116 is spaced forwardly of the pins 94 and extends substantially to frame plates 29. This portion 128 is formed with laterally outwardly opening recesses 129 through which a pair of horizontally spaced, rigid, forwardly extending pins 130 on a stripper plate 131 project. These pins support the plate 116 against downward movement, yet the plate may readily be lifted off the drum when the housing section 120 is removed.

A pair of rearwardly projecting ribs are stamped from the portion 128 at 132 (FIG. 5) between which the stamps 48 are adapted to extend and be guided thereby. Also these ribs may support portion 128 spaced from the stripper plate. In addition, portion 128 may be dimpled at 133 to provide rearward projections that engage the forward side of the stripper plate.

The plate 117 has a lower portion 136 (FIG. 10) that corresponds in function and structure to portion 128, except that it is not formed with ribs 132, but is dimpled to provide rearward projections 137 that space the lower portion from a stripper plate 138.

Stripper plate 131 carries an upwardly projection flat tongue 140 that extends into the groove 93 on drum 84 to strip the stamps from the pins 94 and plate 138 has a pair of similar tongues 141 (FIG. 10) that strip the stamps 49 from drum 83.

The forward surfaces of the stripper plates 131 and 138 support and guide the stamps 48, 49 to below and past the cutters 33, 34, and the lower end portions of said stripper plates respectively extend to and are rigidly held in position by the pair of frame plates 29, 30.

Secured at one end thereof to the upper portion of plate 116 above the drum 84 is an upwardly bowed leaf spring 142, and a similar spring 143 is secured to the upper portion of hold-down plate 117. These springs are adapted to be engaged by the top wall of the housing section 20 for holding the hold-down plates in position, but it is to be understood that the seats 119 and 120 and pins 130 and similar pins on stripper plate 138 prevent the hold-down plates from exerting any pressure on the stamps 48, 49. The springs 142, 143 merely hold the hold-down plates in position to prevent the stamps from being moved off the pins on the drums until they are stripped from the pins to pass below the cutters.

The drum 84 is secured on a horizontal shaft 144 (FIG. 4) and drum 83 is secured on a shaft 145 (FIG. 2) that is in alignment with shaft 144. These shafts are rotatably supported on bearings that are respectively carried by frame plates 29, 30, and which plates may be formed with upwardly opening slots 146 (FIG. 2) so that the bearings and drums may be removed in an upward direction out of the slots for repair or replacement. FIG. 11 is illustrative of the bearings at the adjacent frame plates 29, 30 in which bearing 148 for the end of shaft 145 is formed with an annular groove 149 adapted to receive the adjacent edges of the slot 146 in frame plate 30. Bearing 150 is similarly formed with an annular groove 151 that receives the edges of slot 146 in frame plate 29. Washers 151' may be keyed onto the ends of the shafts adjacent to the bearings. The bearings adjacent to the other ends of the shafts may be the same. FIG. 7 shows a bearing 150 that is yieldably held in the lower end of a slot 146 by a spring wire 152 that is secured at one end to a pin 153 secured on frame plate 30 and extends from the pin across a flattened upper surface 150' on bearing 150 and then under a pin 154 that is secured on plate 30 at the opposite side of the bearing. Thus the spring also prevents rotation of the bearing, and similar means is provided for each of the other bearings 148, 150. Thus, upon lifting the end of the wire from under pin 154 each bearing is free for movement out of each slot 140. Replacement of the bearings is equally simple.

The manually actuatable means for each of the drums 83, 84 is the same, hence a description of the means shown in FIG. 2 for the drum 83 will be the same for corresponding elements for the drum 84.

Shafts 145, 146 extend outwardly of the outermost frame plates 29, 30 at the opposite ends of the machine, and into end housing sections 1, 2.

Secured on the outwardly projecting end of each shaft 145, 146 is a sprocket wheel 155 (FIG. 2), and at the lower forward portion of the machine behind the housing plate 7 is a corresponding sprocket wheel 156 rotatable on a shaft 156' that is secured to frame plate 30, and a similar one is secured to the frame plate 29 at the other end of the machine.

The sprocket teeth on these wheels have well rounded outer ends, since they are to also function as cam surfaces for a rotatably supported follower as will later be explained.

An endless chain of specially formed links 157 extends around each pair of sprocket wheels 155, 156. Each of the links 157 is formed with a pair of widely spaced end portions 158 at one of the ends thereof, and which portions 158 are parallel but have convergently extending continuations that are integrally connected at 159 at their convergent ends (FIGS. 1, 2). The end portion 159 on each link is received between the end portions 158 of the adjacent link and a pivot 160 pivotally secures the portion 159 between the end portions 158. A finger engageable element 163 is integral with each end portion 159 and projects outwardly of the chain, and each element 163 also projects over the outer sides of the spaced end portions 158 (FIG. 3). The teeth of the sprocket wheels are adapted to project into the space 164 (FIG. 1) that is between the convergently extending continuations of end portions 158 to bear against the portions 159 for driving the chain. The said elements 163 will project through the slots 15 in the forward inclined flanges of the end housing elements 1, 2 (FIGS. 1, 2) and the elements 163 on the forward runs of the chains that so project through the slots 15 have upwardly facing surfaces concavely curved to follow the rounded convex contour of the end of one of the fingers 165 (FIG. 2) of an operator. The portion of the chain at each slot 15 is parallel with the slot, and is slidably supported on a correspondingly inclined plate 166 that is secured on each of the outermost frame plates 29, 30. Thus the finger of the operator will not extend between the chain links, but will extend between the adjacent elements 163 only and a generally downward straight line movement of the finger extending through slot 15 will cause the drums 84 and 83 to rotate counterclockwise as seen in FIG. 5 to move the stamps from below the cutters 34, 35, according to which of the sprocket chains is actuated.

The rear run or flight of each sprocket chain slidably extends over a take-up plate 168 that is adjustably secured to each of the frame plates 29, 30 by screws 169 to permit taking up any undesirable slack in the chains.

A rod 170 extends through and is carried by the frame plates 129, 130 and projects at its ends into the space between the forward and rear runs of each of the two sprocket chains, which chains may be generally designated 161. On each of the projecting ends of the rod is rotatably mounted one end of an arm 171, which arm is preferably of channel shape to provide a pair of opposed vertical sides. Between said sides at the outer end of arm 171 is a roller 172 that is rotatable on a pin 173 extending between said sides. This roller is preferably of relatively soft rubber and substantially fits between adjacent teeth on each upper sprocket wheel 155. An extension 174 of the web of channel arm 171 projects to the side of rod 170 opposite to said arm, and a coil spring 175 connects the outer end of extension 174 with the take-up plate 168 to yieldably urge the roller 173 into engagement with the teeth of the sprocket wheel 155, and to between the adjacent teeth of the latter. Thus the roller 172 acts like a cam follower, but its function is to ensure proper positioning of the sprocket wheels at the end of each activation thereof, since the roller will never stop on dead center at the outer end of a sprocket tooth, but will cause the wheel to move to a position in which the roller is seated between a pair of adjacent teeth.

This is highly important, since the movement is automatic under the influence of spring 175 in the event the operator should not properly actuate the chain.

Referring to FIG. 1 the graduations 178 on the side 16 of slot 8 are equally spaced apart the distance between pivots 160 of the links of the chain, and a finger actuatable element 163 is between each adjacent pair of graduations. The relationship between the stamps is the same, hence upon moving each element 163 downwardly a distance equal to the distance between an adjacent pair of graduations 178, a stamp will be moved its full length below one or the others of the cutters, with its transverse line of perforations even with the cutting teeth of the cutters. But the roller 172 will always operate to position the elements 163 exactly opposite to the desired numeral or indicia, irrespective of when the operator should release his finger. A correct actuation of the chains, however, is one in which the finger 165 moves to the lower end of each slot 15.

To prevent any possibility of the drums and chains overrunning their intended limits should the operator actuate the chains with unusual vigor, a positive stop is provided in the form of a lever 179 in the lower forward portion of each housing section 1, 2. Each lever is pivoted at 180 to a bracket rigid with the bottom plate 6, which lever has a rearward extension formed with an upwardly directed hook 189. A forward extension forwardly of pivot 180 extends substantially to the portion 9 of the housing section. A gravity actuated, vertically extending strip 181 is against the rear side of said front wall portion 9. This strip has a rearwardly projecting upper end 182 that is narrow and pointed (FIG. 3) and the finger actuatable elements 163 are formed with correspondingly shaped forwardly opening recesses 183 to freely pass the portion 182 when the chain is actuated. A pin 184 rigid with each housing section 1, 2 extends below the rearwardly projecting upper end portion 182 to support strip 181 with its upper surface elevated relative to the lower end of the concavely upwardly facing surface 185 of the wall 9 at the lower end of slot 15 (FIG. 1). The lower end 186 of each strip 181 projects rearwardly over the forward extension 187 of lever 179 and a torsion spring 188 around pivot 180 yieldably urges the extension 187 upwardly and hook 189 downwardly, with the portion 186 of strip 181 supported on the extension 187.

When the finger 165 of an operator moves to the full lower end of each slot 15 it will engage the upper end portion 182 of strip 181 and will move the extension 187 of the lever 179 downward, resulting in the hook 189 engaging one of the finger engageable elements 163, thus positively stopping the chains, and consequently the stamp moving drums, against any further movement.

The lower sprocket wheels 156 each have a spur gear 190 rigid therewith, which gear is connected with a counter 191 through any suitable train of gears 192 or other driving connection, for actuating each counter, the numerals of which are readily observable through windows 193 (FIG. 1) in the lower portion of wall 19 of the central housing section 2. By this means, an accurate count of the stamps that are dispensed is automatically kept.

The rod 170 is rotatable and has a pair of corresponding arms 194 secured at one of their ends thereto, each arm being in the space between the rows of chains 161 in end housing sections 1, 2. These arms each have a right angle projection 195 at their outer ends that are adapted to swing through openings in the take-up plates 168 when the rod 170 is rotated clockwise as seen in FIG. 2, and when the rod is so swung, the end projection on each arm will project through the plate 168 and into the space 164 between an adjacent pair of the chain links to lock the chains against movement.

One end of said rod 170 (FIG. 1) extends into a conventional key actuated lock 196. When the machine is locked, both with respect to lock 196 and 38, there can be no access to the interior of the machine.

FIG. 1 shows a machine adapted to dispense stamps 48 in a single strip from roll 68 by actuation of the dial at the right hand end of the machine, while the mechanism within the left hand housing section 3 is adapted to dispense a five-wide strip of stamps from roll 55. Obviously a wider or narrower strip could be dispensed, such as a 10-wide strip or a ten to five-wide strip or even a single strip, merely by varying the length of drum 83. In FIG. 1 the stamps in each of the five files of roll 55 are of the same denomination as each of the stamps from roll 68. The dot-dash lines (FIG. 1) indicating stamps 49 dispensed from roll 55 show that the finger operated element opposite the $2.50 mark has been pulled down, where each stamp represents a 10¢ purchase, and the operator moved downwardly the element 163 adjacent to the numeral "30." The total purchase therefor was in the amount of $2.80. When the stamps depend below the cutters 33, 34 as indicated in full lines 48, 49 (FIG. 1) it is only necessary for the operator to grasp the depending stamps and elevate the lower ends and tear them from left to right or right to left against the cutters in the ordinary manner in which paper is torn along an edge of a ruler or straight edge, except that in the present instance a transverse row of perforations will register with the row of teeth on the cutters to facilitate accurate tearing.

Referring to FIG. 2, the elongated nuts 45 are adapted to receive machine screws that extend through the end walls 4, 5 of the end housing sections to hold the said end sections in place. These nuts are open at their opposite ends, and the bars 46 only extend part way into them, hence bars corresponding to bars 46 could be threadedly secured into the outer ends of the nuts, and this is what is done where another unit, such as the unit 197 in FIG. 17 is added, and instead of the end housing section 3 being used, the section shown at 198 (FIG. 17) is inserted, this one being open ended (FIG. 18) so the added bar 46′ (FIG. 18) may be used in connection with nuts 45 instead of the machine screws 46. The newly added unit may be for high denominational stamps, or for any stamps that are used in addition to those in the basic unit, and after the new unit is added an end housing section 199 that is structurally identical to section 3, closes the end opposite to section 1. The end section 199 and center section 197 may bear different graduations or numerals thereon according to the stamps to be dispensed. Obviously any number of units may be added, and the structure in each is substantially the same except for the lengths of the drums where there are variations in the widths of the stamp strips.

By directly connecting the chains 161 with the shafts 144, 145 on which the drums 83, 84 are rigid, the rotation of the drums with movement of the finger operating either chain is immediate. There is no backlash, as where gears, countershafts, or the like are used, and frictional resistance to the transmission of power to the stamps is reduced to the minimum.

The finger 165 that operates the chain is not required to engage a plate or other element in order to actuate the machine, nor does it extend through the chain, but merely engages the elements that project from the chain through the slots in the end housing sections.

The hold-down plates that extend over the stamps where they pass over the drums prevent the stamps from disengagement from the pins on the drums, but do not place any noticeable frictional resistance on the stamps to resist their movement.

Pin 184 that engages the vertical strip 181 at the lower end of each chain 161 merely holds the strip vertical, but the end of arm 187 holds it elevated, except when the projection 182 is moved down, and the fact that projection 182 actually extends into a recess in each element 163 ensures immediate and positive locking of the chain at the end of each dispensing operation.

The quick replacement of rolls by merely withdrawing the magazine and dropping a new roll in position is a decided advantage, and since the plates 116 and 117 readily lift off to expose the upper sides of the drum, any operator may readily thread the ends of the stamp strips below the cutters 33, 34 and replace the hold-down plates without difficulty.

The fact that the dispensed stamps cannot be severed from the remainder unless the operator grasps them, is a decided advantage, since there is no accidental dropping of the severed stamps, as where a movable cutter severs the dispensed stamps.

The arm 74 and roller 75 have been called a "take-up" or "tensioning" device, it actually is a shock absorbing structure since it takes the sudden shock of actuation of one of the elements 163 that is connected with drum 84.

It it to be understood that the claims appended hereto are intended to cover all changes and modifications of the example of the invention herein chosen for purposes of disclosure, which do not constitute departures from the spirit and scope of the invention.

I claim:

1. In a stamp dispensing machine for dispensing stamps in a strip from a roll thereof, which machine includes a horizontal base and an upright housing thereover comprising an intermediate housing section provided with discharge opening for stamps from said roll and a pair of substantially corresponding vertically disposed end housing sections releasably connected with said intermediate section at two opposite lateral ends of the latter, roll supporting means removably supported within said intermediate housing section for supporting such roll for rotation thereof upon movement of a strip of stamps therefrom through said discharge opening, guide means within said intermediate section for guiding such strip from said roll to said discharge opening including a rotary drum having projections therein for extending through and positively engaging said strip for moving the latter to and through said discharge opening upon rotation of said drum in one direction;

(a) a pair of spaced, opposed, vertical end plates rigid with said base respectively disposed at opposite ends of said intermediate section adjacent to said end sections of said housing and a horizontal shaft rigid with said drum supporting the latter within said intermediate section for rotation of said drum with said shaft, one end portion of said shaft rotatably extending through and supported by one vertical plate of said pair and projecting into the one end section of said pair thereof adjacent to said one vertical plate, and shaft supporting means on said intermediate section including said one plate of said pair supporting said shaft for rotation thereof;

(b) an upper sprocket wheel and a lower sprocket wheel respectively positioned within the upper and lower portions of said one end section of said housing, said upper sprocket wheel being rigid on said one end portion of said shaft and means independent of said end section rotatably supporting said lower sprocket wheel within said lower portion of said end section spaced a substantial distance below said upper sprocket wheel;

(c) said one end section having a vertical outer wall in spaced opposed relation to the one vertical end plate adjacent thereto and a flange integral with said outer wall extending laterally from the edges thereof to said one vertical end plate, said flange having a generally vertically extending portion formed with an elongated generally vertically extending slot, and a row of equally spaced indicia on said flange along one longitudinally extending edge of said slot for indicating in terms of value the number of stamps to be dispensed;

(d) an endless chain of pivotally connected links extending over said upper and lower sprocket wheels providing a pair of elongated flights of chain extending from one wheel to the other, and chain-positioning means rigid on said one vertical end plate and between said flights supporting one flight of said chain closely below and parallel with said slot from end to end of the latter against deflection of said one flight;

(e) equally spaced finger engageable elements respectively rigid with separate links of said chain spaced from each other a distance equal to the spacing between adjacent pairs of said indicia and sufficient to receive the outer end of a finger of a person between each adjacent pair thereof outwardly of said links, said elements projecting outwardly from said links substantially at right angles thereto and generally horizontally through said slot along said one flight for engagement of the upper surface of each element by said finger for moving said one flight downwardly upon downward movement of said finger to the lower end of said slot to thereby effect rotation of said drum and the dispensing of stamps from said roll through said discharge opening;

(f) said one housing section being removable from said intermediate portion and from said vertical plate independently thereof and independently of said shaft, sprocket wheels, chain and finger engageable elements to facilitate access thereto free from interference therewith, and means for releasably securing said one end housing to said vertical plate.

2. In a stamp dispensing machine as defined in claim 1:

(g) said finger actuatable elements being supported by said links and sprockets for downward movement thereof longitudinally of said slot and past the lower end of the latter, corresponding outwardly opening recesses formed in said finger actuatable elements respectively, each being in a position to be covered by a finger in operative position on the upper surface thereof;

(h) finger actuatable means adjacent to the lower end of said slot extending into the same recess in each element upon movement of each element therepast and supported for downward movement under the influence of downward movement of such finger at the lower end of said slot; and (i) means operatively connected with said finger actuatable means movable into positive engagement with one of said finger engageable elements upon said downward movement of said finger actuatable means for positively holding said chain stationary substantially immediately upon said downward movement of said finger actuatable means.

3. In a stamp dispensing machine as defined in claim 1;

(g) yieldable means between a roll of stamps when the latter is in said roll supporting means with a strip from said roll over said drum and in engagement with the projections on said drum, and said drum, for yieldably transmitting the force applied to said drum through said chain and upper sprocket wheel to such strip and roll upon said downward movement of one of said finger engageable elements to progressively transfer such force to said roll for preventing breakage of such strip through sudden, unyielding shock applied thereto.

4. In a stamp dispensing machine as defined in claim 1;

(h) a second roll supporting means and second drum positioned within said intermediate housing alongside and respectively horizontally aligned with the first mentioned roll supporting means and drum adjacent to the opposite end housing section that is at the end of said intermediate housing section opposite to said one end housing section, and a second vertical plate rigid with said base corresponding to said one vertical plate between said opposite end housing and said intermediate housing;

(i) said opposite end housing section being of the same size and shape as said one housing including an outer end plate and flange integral therewith having a slot formed therein except that said last mentioned flange extends toward the flange on said one end housing section, and a set of upper and lower sprocket wheels, chain, finger engageable elements, and chain supporting means that are duplicates of and have the same arrangement as those within said one end housing section, positioned within said opposite end housing section;

(j) means for releasably securing said opposite end housing section to the outer plate that is adjacent thereto, whereby the moving parts enclosed within said opposite end section may be readily accessible for servicing independently of said one end section and said intermediate section and the parts enclosed therein.

5. In a stamp dispensing machine for dispensing trading stamps and the like in a strip from a roll thereof including a housing having opposite vertically disposed ends, a generally vertically extending side wall formed with a discharge opening for discharge of stamps from within said housing and a generally vertically extending slot at one side of said opening, a horizontal shaft rotatably supported within said housing having a cylindrical drum rigid on said shaft adjacent to said opening, roll supporting means for supporting a roll of stamps below within said housing below said drum in a position with its axis parallel with that of said drum and for movement of a strip of stamps from said roll upwardly and over and in engagement with said drum and through said opening upon rotation of said drum in one direction, and a sprocket wheel rigid on said shaft adjacent to the upper end of said slot and in a vertical plane extending through said slot, the improvement that comprises;

(a) an endless chain of uniform links, and pivots pivotally connecting the adjacent pairs of said links, said chain having a pair of flights extending downwardly from said drum, one flight of which extends longitudinally of said slot closely adjacent thereto and in registration therewith;

(b) finger engageable projections respectively integral and rigid with said links projecting generally horizontally therefrom at substantially a right angle thereto through said slot along said one flight, and means supporting said one flight in a position for projection of such projections through said slot upon downward movement of said one flight;

(c) each adjacent pair of said projections on said chain being spaced apart a distance sufficient to receive the end portion of a finger on the hand of a person therebetween, in a position spaced from outwardly of said links whereby said one flight will be moved downwardly to rotate said drum in said one direction upon downward movement of such finger to the lower end of said slot;

(d) finger actuatable means at the lower end of said slot supported for movement under the influence of such downwardly moving finger at the lower end of said slot for engaging and positively holding one of said finger engageable projections within said housing to stop movement of said chain when such finger is at the lower end of said slot and in engagement with one of said finger engageable projections;

(e) means connected with said finger actuatable means for automatically releasing it from holding relation to said finger engageable means upon removal of such finger from said finger engageable projection.

References Cited in the file of this patent

UNITED STATES PATENTS

| | | |
|---|---|---|
| 920,913 | Chase | May 11, 1909 |
| 1,172,138 | Hyman | Feb. 15, 1916 |
| 2,117,375 | Steiner | May 17, 1938 |
| 2,258,912 | Steen et al. | Oct. 14, 1941 |
| 2,652,115 | Mysels | Sept. 15, 1953 |
| 3,086,417 | Williams | Apr. 23, 1963 |

FOREIGN PATENTS

| | | |
|---|---|---|
| 264,137 | Great Britain | Apr. 7, 1937 |